Oct. 14, 1941.  H. RABEZZANA  2,258,809

THERMOCOUPLE

Filed Oct. 28, 1939

Inventor
Hector Rabezzana
By
Blackmore, Spencer & Flint
Attorneys

Patented Oct. 14, 1941

2,258,809

UNITED STATES PATENT OFFICE 2,258,809

THERMOCOUPLE

Hector Rabezzana, Flint, Mich., assignor to General Motors Corporation, Detroit, Mich., a corporation of Delaware Application October 28, 1939, Serial No. 301,793

5 Claims. (Cl. 136—4)

My invention relates to thermocouples of the type or form wherein the pairs of dissimilar metals which, when heated, develop a difference of potential at the joint between them, are contained within external shells or casings designed to screw into threaded openings in internal combustion engine cylinders, and which are similar in form (but not in function) to the usual spark plugs used with such engines.

The thermocouple illustrated and hereinafter described and claimed is particularly adapted for measuring the temperature within the combustion chamber of an engine, to which end it is designed to screw into a closed bottom recess in the cylinder wall thereof; and I regard my invention as consisting in certain features of the shell or casing mentioned and of thermocouple elements and parts associated therewith apart from and independent of an engine cylinder, as well also as in the combination of such a shell and elements with a closed bottom recess in a cylinder wall designed to receive and house said shell and elements.

In the drawing accompanying and forming a part of this specification:

Figure 1:
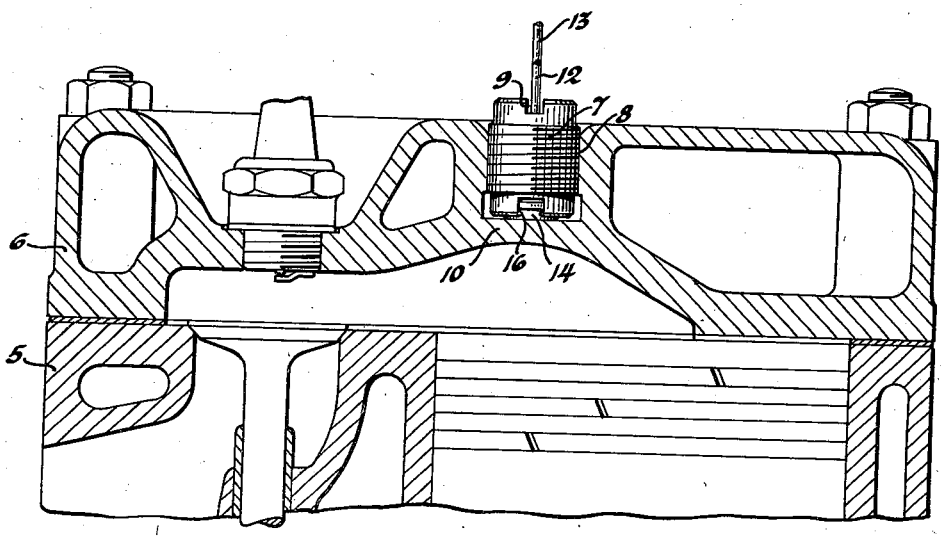
Figure 1 is a view showing my improved thermocouple applied to a conventional type of internal combustion engine, to measure the temperature within the combustion chamber thereof.

Referring now to the drawing wherein the preferred form of my improved thermocouple is illustrated, the numeral 5 designates the upper end of the cylinder of an internal combustion engine, and 6 the head thereof; these parts being shown as of common and conventional form as my invention is not concerned with any particular type or form of engine.

My improved thermocouple comprises a hollow tubular shell 7 made preferably of steel, and which is externally threaded to screw into an internally threaded recess 8 in the cylinder head. This shell is provided with spanner-receiving recesses 9 at its upper end to facilitate the screwing of it into the recess 8; and the lower or inner end of this recess is closed by a bottom wall 10 through which heat from the burning gases inside the engine cylinder flows to the thermocouple housed within the recess 8.

Located within the shell 7 is a supporting member 11 having passages through which two wires 12, 13 of dissimilar materials extend, and which member serves to support the thermocouple elements of my device in proper position relative to one another. This member may be of insulating material such, for example, as porcelain; or it may be made of metal in which case and because the wires 12, 13 will commonly fit loosely in the passages provided for them, and because of a certain amount of unavoidable oxide present upon the wires, sufficient insulation will be provided to limit leakage of the current due to the minute voltage produced by the single pair of thermocouple elements made use of to a negligible amount.

The wires 12, 13 are preferably of iron and of constantan; although wires of other metals or alloys may be used so long as the pair selected will produce an electrical potential or voltage when their lower or inner ends (which are connected together as will be appreciated) are heated by gases within the engine cylinder.

The lower or ends of the wires 12, 13 extend through holes in a steel bridge piece or connecting member 14 the ends of which lie within peripheral recesses 15 at the inner end of the shell 7, to thereby prevent said member from rotating as the thermocouple is screwed into or out of the recess 8; and metal of the shell is swedged over the side edges of the ends of the connecting member 14, as indicated by the numerals 16, to thereby hold the parts in assembled relation while at the same time permitting slight upward movement of the ends of said connecting member within the recesses 15, and of the supporting member 11 within the shell 7. The lower ends of the wires 12, 13 are fused in place within the holes in the bridge piece by a pool of metal 17 which is melted and caused to flow about the extremities of the wires by an electric arc, a blow-pipe, or otherwise, after which the lower surface of said member is ground flat so that a good heat conducting contact will be secured between the member 14 and the bottom wall 10.

Figure 2:
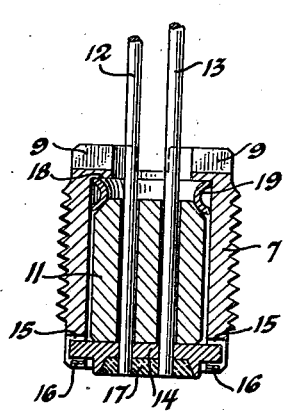
Figure 2 is a view showing the thermocouple upon a larger scale, and upon a vertical central plane.
Figure 3:
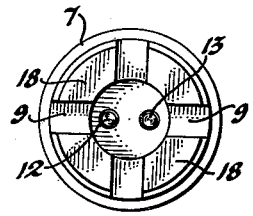
Figure 3 is a view showing my improved thermocouple in plan and as seen from a position above the same.
Figure 4:
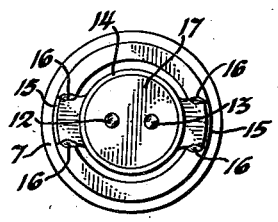
Figure 4 is a similar view showing the thermocouple as seen from a position below the same.

The upper and outer end of the shell 7 has an internal abutment shown as in the form of an inwardly extending ledge 18, and an annular holding member is interposed between said ledge and the upper end of the supporting member 11; said holding member being preferably in the form of an annular resilient gasket 19 C-shaped in cross-section and made of spring steel or equivalent material interposed between said abutment and the upper end of the supporting member, as best shown in Figure 2. This member 19 is subjected to compression as the shell 7 is screwed into the internally threaded recess 8 in the head 6 or equivalent wall of the engine cylinder, thereby forcing the lower surface of the connecting member or bridge piece 14 into firm engagement with the bottom wall 10 of said recess by force transmitted through the supporting member 11 to said connecting member against which it abuts. The recesses 15 are of such extent vertically, see Figures 1 and 2, that the member 14 may move upward to a slight degree after its lower surface comes into contact with the wall 10, thus compressing and distorting the C-shaped member 19; with the result that said member 14 is held against the bottom wall 10 with a yielding pressure due to said C-shaped member.

The outer ends of the wires 12, 13 lead to the terminals of a milli-voltmeter or equivalent instrument for indicating electrical potential, as is usual in the use of thermocouples to indicate the temperature at the joint or junction between dissimilar metals connected together and subjected to heat; and, while I have referred to the thermocouple elements or wires as being of constantan, and of iron, elements of other metals or alloys may be used, so long as an electrical potential will be produced when the junction between the two selected is heated. It will also be appreciated that while the measuring instrument contemplated depends upon potential for its operation, it will commonly be calibrated so that its readings will indicate temperatures in degrees at the junction between the thermocouple elements which are subjected to heat.

Having thus described and explained my invention I claim and desire to secure by Letters Patent:

1. A thermocouple comprising a hollow tubular shell having an internal abutment adjacent its upper end; a vertically movable supporting member within said shell and having two passages extending longitudinally therethrough; two wires of different materials extending one through each of said passages; a metallic connecting member whereby the inner ends of said wires are connected with one another and against which the lower end of said supporting member abuts; and an annular holding member between said abutment and the upper end of said supporting member.

2. A thermocouple comprising an externally threaded hollow tubular shell having an inwardly extending ledge adjacent its upper end; a vertically movable supporting member within said shell and having two passages extending longitudinally therethrough; two wires of different materials extending one through each of said passages; a metallic connecting member whereby the inner ends of said wires are connected with one another and against which the lower end of said supporting member abuts; and an annular resilient member C-shaped in cross-section between said inwardly extending ledge and the upper end of said supporting member.

3. A thermocouple comprising an externally threaded hollow tubular shell having an inwardly extending ledge adjacent its upper end; a vertically movable supporting member within said shell and having two passages extending longitudinally therethrough; two wires of different materials extending one through each of said passages; a metallic connecting member having holes through which said wires extend and within which the extremities of said wires are fused, and against which connecting member the lower end of said supporting member abuts; and an annular resilient member between said inwardly extending ledge and the upper end of said supporting member.

4. A thermocouple comprising an externally threaded hollow tubular shell having an inwardly extending ledge adjacent its upper end; and oppositely located vertically extending recesses at its lower end; a vertically movable supporting member within said shell and having two passages extending longitudinally therethrough; two wires of different materials extending one through each of said passages; a transversely extending metallic connecting member whereby the inner ends of said wires are connected with one another and against which the lower end of said suppporting member abuts, and the ends of which connecting member extend into and are vertically movable within said recesses; and an annular resilient member between said inwardly extending ledge and the upper end of said supporting member.

5. In combination, a cylinder wall having an internally threaded recess closed at its lower end by a bottom wall through which heat may flow; an externally threaded hollow tubular shell rotatable within said recess and having an internally extending ledge adjacent its upper end; a supporting member located within said shell and having two passages extending longitudinally therethrough; two wires of different materials extending one through each of said passages; a metallic connecting member whereby the inner ends of said wires are connected with one another and against which the lower end of said supporting member abuts, and which connecting member abuts against the bottom wall of said internally threaded recess; and an annular resilient member C-shaped in cross-section between said inwardly extending ledge and the upper end of said supporting member.

HECTOR RABEZZANA.